(12) United States Patent
Ramesh et al.

(10) Patent No.: US 12,014,119 B2
(45) Date of Patent: Jun. 18, 2024

(54) ENHANCING A CONSTRUCTION PLAN WITH DATA OBJECTS

(71) Applicant: ORACLE INTERNATIONAL CORPORATION, Redwood Shores, CA (US)

(72) Inventors: Jithesh Ramesh, Seaford (AU); Belinda Dal Lago, Fitzroy (AU); James Peter Le Souëf, Yarraville (AU); Stewart Gleadow, Ringwood (AU); Guannan Wei, Mitcham (AU)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 672 days.

(21) Appl. No.: 16/272,015

(22) Filed: Feb. 11, 2019

(65) Prior Publication Data
US 2020/0257767 A1  Aug. 13, 2020

(51) Int. Cl.
G06F 30/13 (2020.01)
G05B 19/418 (2006.01)
(Continued)

(52) U.S. Cl.
CPC .......... *G06F 30/13* (2020.01); *G06F 3/04842* (2013.01); *G06F 16/164* (2019.01);
(Continued)

(58) Field of Classification Search
CPC ......... G06F 30/13; G06F 16/164; G06T 11/60
See application file for complete search history.

(56) References Cited

U.S. PATENT DOCUMENTS 7,051,040 B2 * 5/2006 Easwar ............... G06F 16/9577
707/999.102
7,792,876 B2 * 9/2010 Easwar .................. G06F 16/51
707/803

(Continued)

FOREIGN PATENT DOCUMENTS

WO     2015188203 A3    3/2016

OTHER PUBLICATIONS

Painter, John R., Gordon M. Mair, and Trevor G. Clarkson. "Computer-integrated engineering systems." In Mechanical Engineer's Reference Book, pp. 1-44. Butterworth-Heinemann, 1994 (Year: 1994).*

(Continued)

*Primary Examiner* — Akash Saxena
(74) *Attorney, Agent, or Firm* — Potomac Law Group, PLLC

(57) ABSTRACT

Embodiments are directed to a construction plan management system. Embodiments retrieve a drawing corresponding to the construction plan, the drawing including document coordinates. Embodiments render the drawing. Embodiments retrieve a data object corresponding to an issue that corresponds to the construction plan, the data object including pinstore coordinates. Embodiments generate a viewport layer on top of the rendered drawing, the viewport layer including viewport coordinates. Embodiments convert the pinstore coordinates of the data object to converted viewport coordinates and display the data object as a pin on the viewport layer using the converted viewport coordinates.

20 Claims, 16 Drawing Sheets

(51) Int. Cl.
*G06F 3/04842* (2022.01)
*G06F 16/16* (2019.01)
*G06F 40/106* (2020.01)
*G06F 40/143* (2020.01)
*G06F 40/151* (2020.01)
*G06F 40/169* (2020.01)
*G06F 111/02* (2020.01)
*G06T 3/60* (2006.01)
*G06T 11/60* (2006.01)

(52) U.S. Cl.
CPC ...... *G06F 16/168* (2019.01); *G05B 19/41885* (2013.01); *G06F 40/106* (2020.01); *G06F 40/143* (2020.01); *G06F 40/151* (2020.01); *G06F 40/169* (2020.01); *G06F 2111/02* (2020.01); *G06T 3/60* (2013.01); *G06T 11/60* (2013.01)

(56) References Cited

U.S. PATENT DOCUMENTS

| | | | |
|---|---|---|---|
| 8,165,402 B2* | 4/2012 | Ohira | G06V 30/412 358/448 |
| 8,898,158 B2 | 11/2014 | Martin et al. | |
| 9,070,216 B2 | 6/2015 | Golparvar-Fard et al. | |
| 10,416,952 B2* | 9/2019 | Cyr | G06T 3/40 |
| 2002/0051016 A1* | 5/2002 | Moriwaki | G06T 3/60 715/765 |
| 2002/0109729 A1* | 8/2002 | Dutta | G06Q 30/02 715/790 |
| 2004/0225968 A1* | 11/2004 | Look | G06Q 10/10 715/778 |
| 2006/0010246 A1* | 1/2006 | Schulz | G06F 3/04847 382/253 |
| 2006/0085322 A1 | 4/2006 | Crookshanks | |
| 2006/0285152 A1* | 12/2006 | Skillen | G06F 16/29 358/1.15 |
| 2008/0071562 A1 | 3/2008 | Clemenson et al. | |
| 2010/0077316 A1* | 3/2010 | Omansky | G06Q 10/10 715/751 |
| 2012/0010995 A1* | 1/2012 | Skirpa | G06F 16/9577 705/14.49 |
| 2012/0151408 A1* | 6/2012 | Groth | G06F 16/95 715/799 |
| 2013/0013269 A1* | 1/2013 | Martin | G06Q 10/00 703/1 |
| 2014/0244330 A1* | 8/2014 | Hall | G06Q 10/063114 705/7.15 |
| 2014/0250370 A1* | 9/2014 | Woodard | G06F 40/151 715/236 |
| 2015/0156075 A1* | 6/2015 | Gist | H04L 41/22 709/201 |
| 2015/0278483 A1* | 10/2015 | Pruitt | G16H 10/60 705/3 |
| 2018/0011823 A1* | 1/2018 | Chegini | G06F 3/04842 |
| 2019/0311076 A1* | 10/2019 | Morton | G06Q 50/163 |
| 2019/0346981 A1* | 11/2019 | Pasala | G06F 8/33 |
| 2022/0214999 A1* | 7/2022 | Yadav | G06F 30/10 |

OTHER PUBLICATIONS

W3C Editor's Draft for SVG viewport from Archive.org (https://web.archive.org/web/20181124162950/https://www.w3.org/TR/SVG/coords.html); pp. 33 (Year: 2018).*

Anonymous; "PlanGrid—Build with confidence"; downloaded Aug. 2, 2018; https://www.plangrid.com/gb/.

Anonymous; "PlanGrid—Sheet compare"; downloaded Aug. 2, 2018; https://www.plangrid.com/features/sheet-compare/.

Anonymous; Mobile FieldApp for Constructon—MapGage; "Mobile Data Collection for Construction Projects & Site Inspection Teams"; downloaded Jul. 30, 2018; http://www.mapgage.com/drones-in-construction.

Anonymous;"PlanGrid Launches New Feature: Sheet Compare"; Dec. 3, 2015; https://www.plantautomation.com/doc/plangrid-launches-new-feature-sheet-compare-0001.

F. Barton; "PlanGrid—Collaboration tool for construction team"; May 25, 2017; http://plangrid.findmysoft.com/.

L. Christensen; "Intertext: On Connecting Text in the Building Process"; Conference Paper Jan. 2015; DOI: 10.1007/978-3-319-20499-4_6; https://www.researchgate.net/publication/289127766_Intertext_On_Connecting_Text_in_the_Building_Process?_sg=IWAiPgQjJ94n1d_xjl55I2R_qRdZR5Z46M_84bc412Hd5SdhDgofGnv-GsnNNKodVbxwG-I7MA.

* cited by examiner

Fig. 16

ENHANCING A CONSTRUCTION PLAN WITH DATA OBJECTS

FIELD

One embodiment is directed generally to a computer system, and in particular to a computerized construction plan enhanced with data objects.

BACKGROUND INFORMATION

Construction management systems store and retrieve construction plans/blueprints or other project related drawings so that they are accessible to construction management teams. These construction management teams rely on drawing specifications as the primary resource to make decisions and show progress. However, quality assurance and change management processes are typically displayed on different systems than the drawings. As a result, there is an extra burden on construction team members to identify, locate, resolve and update business processes based on the drawings.

SUMMARY

Embodiments are directed to a construction plan management system. Embodiments retrieve a drawing corresponding to the construction plan, the drawing including document coordinates. Embodiments render the drawing. Embodiments retrieve a data object corresponding to an issue that corresponds to the construction plan, the data object including pinstore coordinates. Embodiments generate a viewport layer on top of the rendered drawing, the viewport layer including viewport coordinates. Embodiments convert the pinstore coordinates of the data object to converted viewport coordinates and display the data object as a pin on the viewport layer using the converted viewport coordinates.

BRIEF DESCRIPTION OF THE DRAWINGS

FIG. 16 illustrates an example screenshot in accordance to embodiments.

DETAILED DESCRIPTION

Figure 1:
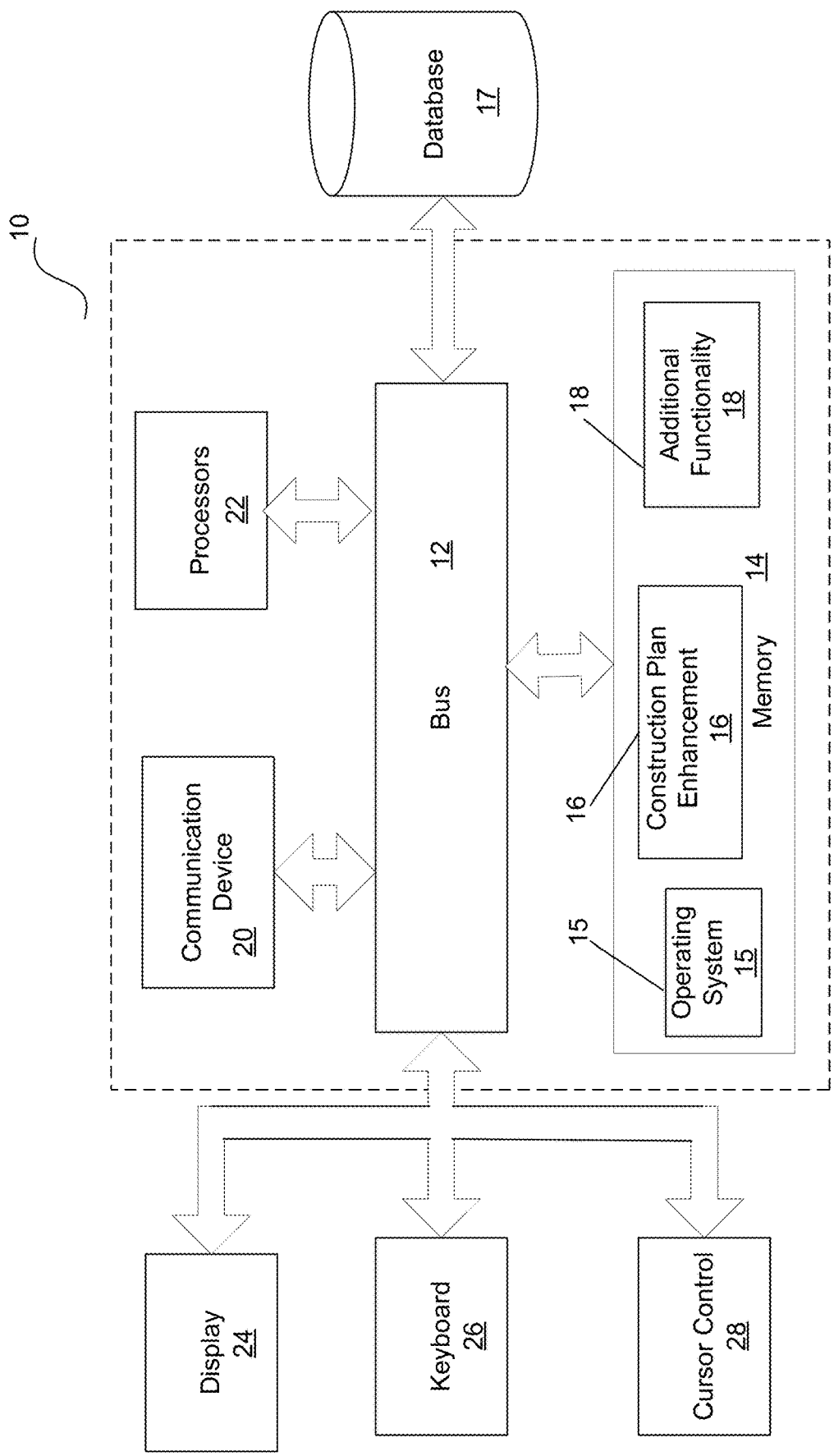
FIG. 1 is a block diagram of a computer server/system in accordance with an embodiment of the present invention.

Embodiments layer or "pin" data objects/records onto a construction management drawing. The data objects provide additional data records for the drawing along with a precise coordinate mapping without editing or revising the actual underlying drawing.

FIG. 1 is a block diagram of a computer server/system 10 in accordance with an embodiment of the present invention. Although shown as a single system, the functionality of system 10 can be implemented as a distributed system. Further, the functionality disclosed herein can be implemented on separate servers or devices that may be coupled together over a network. Further, one or more components of system 10 may not be included. For example, for functionality of a server, system 10 may need to include a processor and memory, but may not include one or more of the other components shown in FIG. 1, such as a keyboard or display.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network, or any other method.

Computer readable media may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a construction plan enhancement module 16 that enhances construction plans with data objects, and all other functionality disclosed herein. System 10 can be part of a larger system. Therefore, system 10 can include one or more additional functional modules 18 to include the additional functionality, such as an "Aconex" construction management system from Oracle Corp. A database 17 is coupled to bus 12 to provide centralized storage for modules 16 and 18 and store construction plans, data objects, etc. In one embodiment, database 17 is a relational database management system ("RDBMS") that can use Structured Query Language ("SQL") to manage the stored data.

In one embodiment, particularly when there are a large number of items to store and retrieve, database 17 is implemented as an in-memory database ("IMDB"). An IMDB is a database management system that primarily relies on main memory for computer data storage. It is contrasted with database management systems that employ a disk storage mechanism. Main memory databases are faster than disk-optimized databases because disk access is slower than memory access, the internal optimization algorithms are simpler and execute fewer CPU instructions. Accessing data in memory eliminates seek time when querying the data, which provides faster and more predictable performance than disk.

In one embodiment, database 17, when implemented as a IMDB, is implemented based on a distributed data grid. A distributed data grid is a system in which a collection of computer servers work together in one or more clusters to manage information and related operations, such as computations, within a distributed or clustered environment. A distributed data grid can be used to manage application objects and data that are shared across the servers. A distributed data grid provides low response time, high throughput, predictable scalability, continuous availability, and information reliability. In particular examples, distributed data grids, such as, e.g., the "Oracle Coherence" data grid from Oracle Corp., store information in-memory to achieve higher performance, and employ redundancy in keeping copies of that information synchronized across multiple servers, thus ensuring resiliency of the system and continued availability of the data in the event of failure of a server.

In one embodiment, system 10 is a computing/data processing system including an application or collection of distributed applications for enterprise organizations. The applications and computing system 10 may be configured to operate with or be implemented as a cloud-based networking system, a software-as-a-service ("SaaS") architecture, or other type of computing solution. Further, in embodiments, a mobile device that includes all or some of the components of FIG. 1 is implemented to execute the functionality disclosed herein, either in a standalone manner or in communication with a web server, so that the functionality can be easily accessed at a construction site or other remote location.

Figure 2:
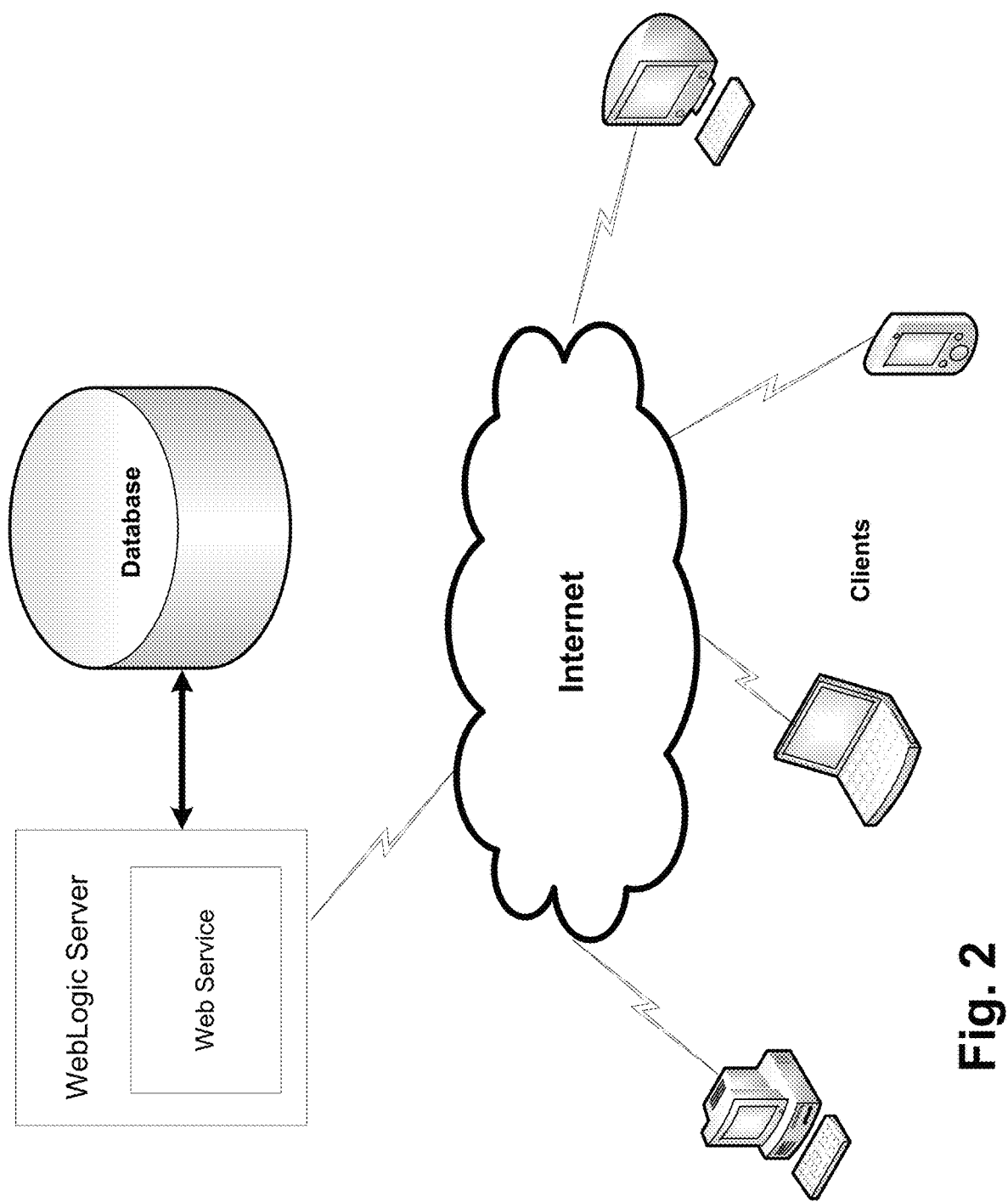
FIG. 2 is a block diagram that illustrates a plurality of clients that access a web service (i.e., the construction plan data object enhancement functionality disclosed herein) that is implemented on a WebLogic Server from Oracle Corp. in one embodiment.

FIG. 2 is a block diagram that illustrates a plurality of clients that access a web service (i.e., the construction plan data object enhancement functionality disclosed herein) that is implemented on a WebLogic Server from Oracle Corp. in one embodiment. In other embodiments, other implementations of a web service can be used. Each client executes a browser or other functionality.

In general, construction management teams need quick, easy methods to mark and associate site problems or processes to a construction drawing in the current set, at any time of construction. Construction plans or drawings are used as a primary reference on site, but users frequently have to switch context when creating and recording data objects or records such as defects. This can be time consuming, tedious and error prone. When looking at a room or area on-site using a construction plan or drawing, there is no easy way to know about what types of issues or other records exist in that physical space with known systems. Recording the exact position of an issue on a floor or even entire site plan is difficult and error prone using text-based descriptions alone as with known systems. The result is that there can be time lost in directing people to where exactly the record is located.

Construction drawings are artifacts produced by an architect, designer or engineer when translating a design intent into information and instructions that can be used by the project team to build a construction project. The information and instructions are outlined in a standard format that a construction team can understand using overarching engineering drawing standards. Table 1 below describes various types of construction drawings in accordance with embodiments.

TABLE 1

| Theme | Term | Meaning |
| --- | --- | --- |
| Drawings related to a construction project lifecycle | Shop Drawing | Shop drawings can be more than just a basic drawing. They can also be schedules, diagrams, or other related data intended to illustrate materials, products, or systems for some portion of the work. The construction contractor, sub-contractor, manufacturer, distributor, or supplier can prepare them along with providing product data. Product data include brochures, illustrations, performance charts and other information by which the work will be judged. An engineering assistant may be required to draft shop drawings for minor shop and field projects. Shop items, such as doors, cabinets and small portable structures may need to be drawn from portions of the design drawings, specification, material schedules, or from freehand sketches given by the design engineer. |
| Sets | Contract Set | The Contract Document set includes: Contract Forms (Agreement, Performance Bond, Payment Bond, Certificates) Contract Conditions (General and Supplementary) Specifications (Broken down by discipline) Drawings (Broken down by discipline) |
| | Construction Documents | A typical complete set of construction drawings should include: Title Sheet Specifications |

TABLE 1-continued

| Theme | Term | Meaning |
|---|---|---|
| | | Schedules |
| | | Demolition Plans |
| | | Plans (Foundation, Floor & Roof) |
| | | Elevations |
| | | Sections |
| | | Wall Sections & Details |
| | | Interior Elevations & Details |
| | | Cabinetry Details |
| | | Reflected Ceiling Plan |
| | | Mechanical & Electrical Plans & Notes |
| | | Structural/Framing Plans & Details |
| | Working/ Current Set | The working/current set differs from the Contract Set because it can change through the construction phase as design changes and as-builts are incorporated into the set. |

In general, construction plans are in the form of an electronic drawing format such as .pdf, .dwg, etc. There is a need for construction management systems to augment these drawings with additional information, including data objects or records. Examples of such data objects in embodiments include:

- Adhoc inspection results including defects/snag/punch list item, etc. Construction defects include any deficiency in the performing of the design, planning, supervision, inspection, construction or observation of construction to any construction project. Constructions defects general fall into four categories: design deficiencies; material deficiencies; construction deficiencies; or subsurface deficiencies.
- Structured inspections including site walks, site diary, equipment pre and post checks, commissioning/decommissioning, asset audits (e.g., drill shaft, crane, framework, etc.), environmental studies (e.g., soil testing, flora & fauna, etc.), and audits.
- RFI (request for information). Used when requestors think they know what they want but need more information from vendors. RFIs are designed to collect information from a vendor with no commitment to engage in any particular project and it is likely that minimal or no project details would be provided. Instead the document would focus on the vendor capabilities, skills and experience.
- Visual documentation of the site including photos, 360 degree photos, panoramic, video, audio, augmented reality views. These give a realistic state of what the current situation is.

In order to incorporate the data objects (i.e., additional information) into the construction plans, known systems, in general, edit the underlying drawing document, such as for .pdf documents in which .pdf annotation technology is frequently used to superimpose business records onto specification sheets. However, this marking up of the underlying document is sometimes a violation of contractual obligations which do not allow editing of drawing documents, and is otherwise undesirable.

Figure 3:
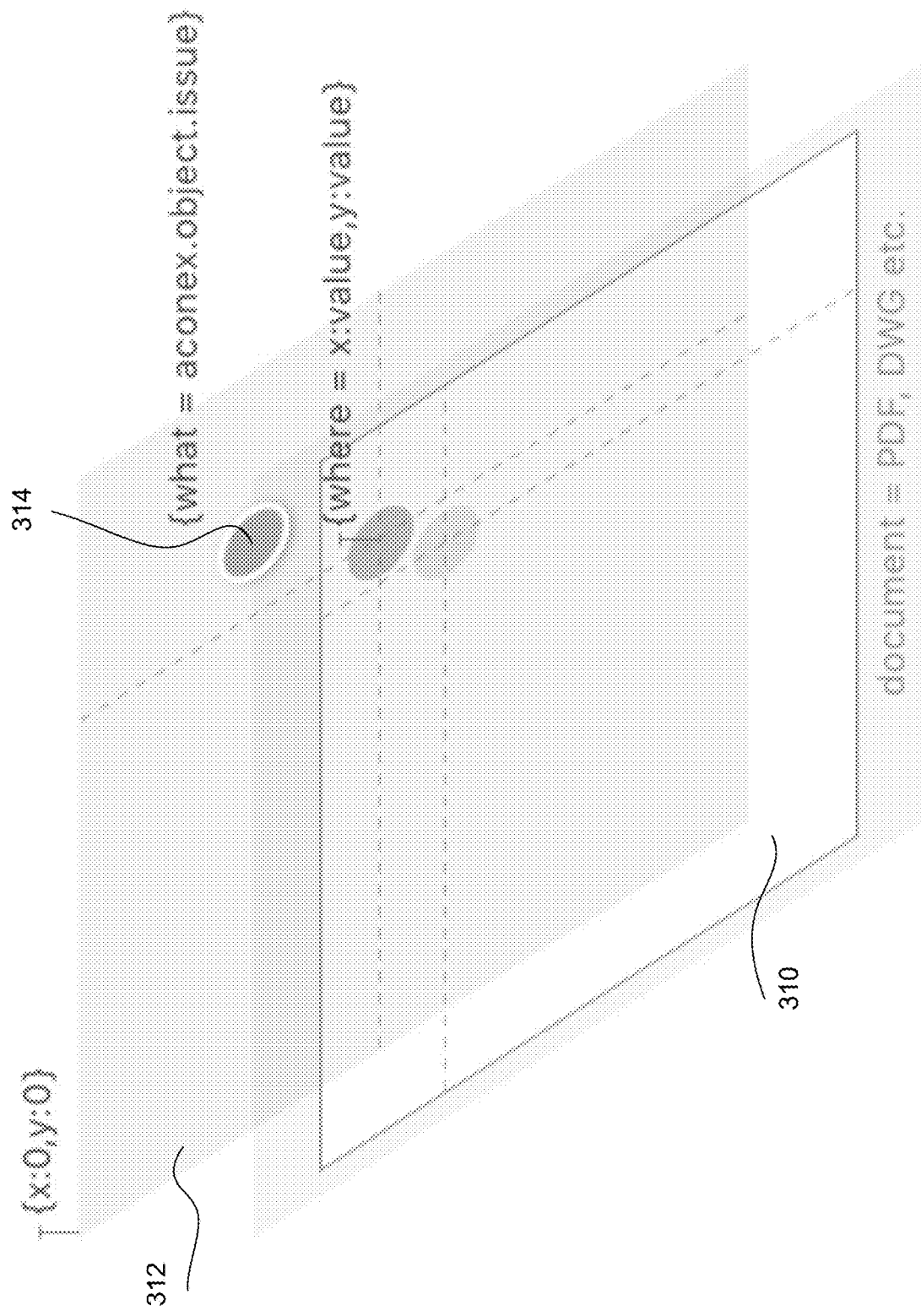
FIG. 3 illustrates an overview of how a document is rendered in accordance to embodiments of the invention.

FIG. 3 illustrates an overview of how a document is rendered in accordance to embodiments of the invention. A document 310 is rendered in its native format (e.g., .pdf, .dwg) using a document renderer in a drawing layer. A viewport layer 312 is rendered on top of rendered document 310. Viewport layer 312 is what the user sees through the device's output mechanism at any point during an active session. It differs from the user interface ("UI") of the device because the UI of the application could have other elements that does not relate to the drawing. The viewport size in embodiments always remains the same for a set hardware unless flexible/stretchable device screens are implemented.

A data object in the form of a pin 314, which is a visual representation of a data object, is retrieved from a database and includes metadata regarding what it is (e.g., the type of issue and the issue ID) and where it is located on the coordinate system. As a result, data object or pin 314 is located at the precise coordinate location on layer 312. Table 2 below illustrates the database record schemas for an example inspection data object in accordance to embodiments and includes examples of metadata associated with the data objects:

TABLE 2

| Issue | Inspection | Mail |
|---|---|---|
| Issue type | Inspection category | Mail type |
| Issue id | Inspection id | Mail ID |
| Issue status | Inspection status | Mail status |
| Description | Title | Mail Subject |
| Attachments (Photos, comments) | Description | Mail Body |
| Proprietary fields | Responses | Attachments |

Figure 4:
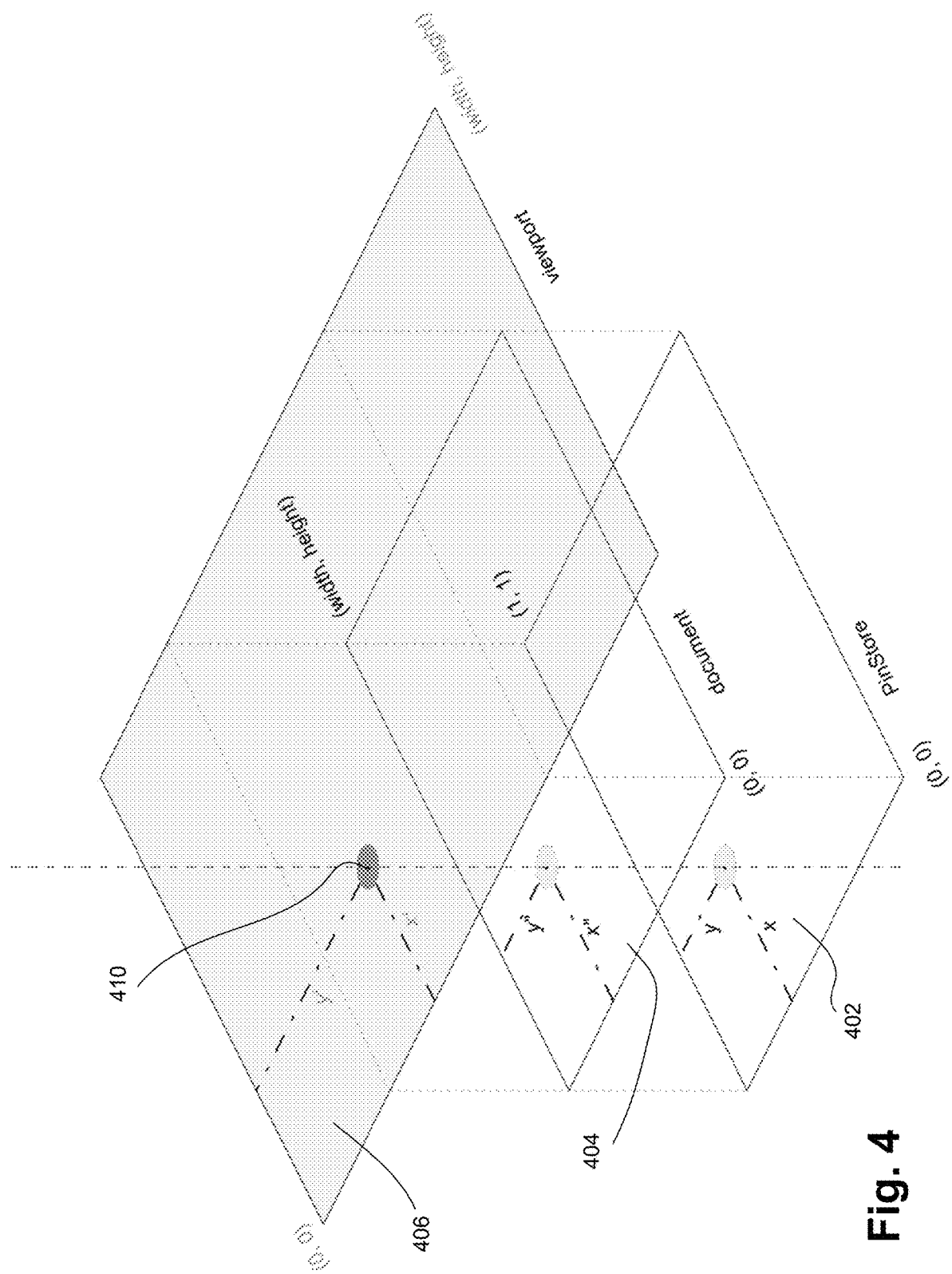
FIG. 4 illustrates an arrangement of a pinstore, a document and a viewport with a pin in accordance to embodiments.

FIG. 4 illustrates an arrangement of a pinstore 402, a document 404 and a viewport 406 with a pin 410 in accordance to embodiments. A pin is a representation of a data object. Pinstore 402, in order to make the pinned position of data objects be unrelated with both the format of the pinned document 404 and the displayed screen or viewport 406, stores a normalized position of data objects or records and can be implemented with database 17 of FIG. 1. The pinstore includes abstract elements that know the reference and position of each pin, but that is not a markup or annotation, and does not involve editing a .pdf. Example pseudo-code of a data object in the pinstore corresponding to a pin as stored in a database in the form of a schema is as follows:

```
recordID: string GUID
pinID: GUID
drawing: {
    drawingID: GUID
    x: Number 0-1
    y: Number 0-1
}
record: {
    recordID: string
    recordType: Issue | Mail | Document | Photo
}
```

Embodiments then apply conversions for both pin creating/changing and pin displaying. In addition to creating a data object, pin creation involves creating the representation and the x,y,z position in reference to the drawing within the context of the viewport of the device. A user can create pinned data object 410 at a specific location on document 404, and then move it to a different location by selecting and sliding on viewport 406 such as through a drag and drop operation. The "coordinates" of the data object are referred to, for purposes of this disclosure, as (x, y) in pinstore 402

("pinstore coordinates"), (x", y") on document 404 ("document coordinates"), and (x', y') on viewport 406 ("viewport coordinates").

Figure 5:
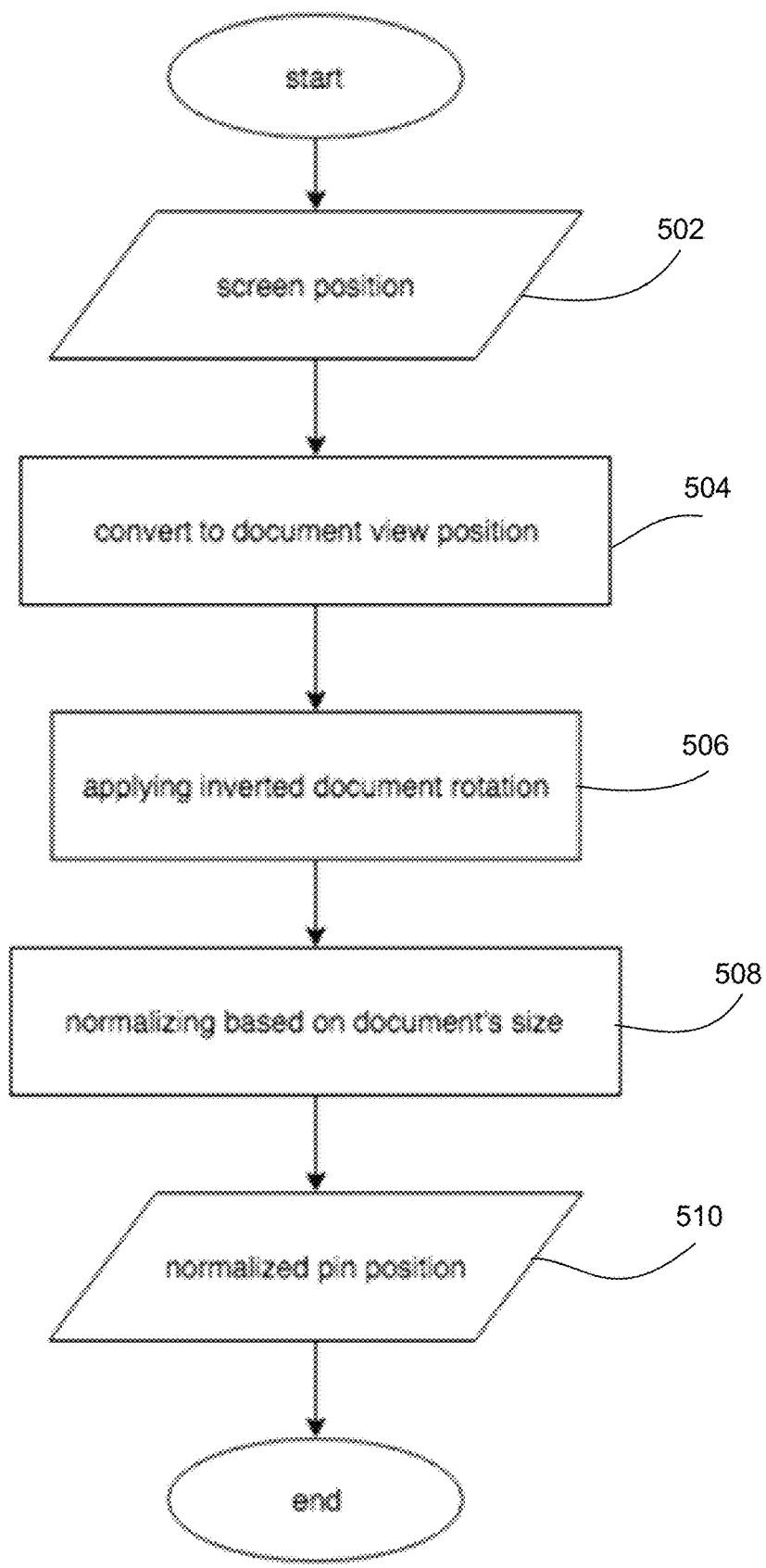
FIG. 5 is a flow diagram of the functionality of the construction plan enhancement module of FIG. 1 when converting a displayed screen or viewport position of a data object in accordance with one embodiment.

FIG. 5 is a flow diagram of the functionality of construction plan enhancement module 16 of FIG. 1 when converting a displayed screen or viewport position/coordinates of a data object (i.e., (x', y') on viewport 406) to a pinstore stored position/coordinates of the data object (i.e., (x, y) in pinstore 402) in accordance with one embodiment. In one embodiment, the functionality of the flow diagram of FIG. 5 (and FIG. 6 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software. The functionality of FIG. 5 converts the pinned position of viewport layer 406 to the stored pinstore position at pinstore layer 402 of FIG. 4.

At 502, the position of the data object represented by a pin on the viewport or user interface is determined as a result of a user creating a new pinned object 410, or moving an existing pinned object 410 to a different/new position of the screen such as through a drag and drop or slide operation on layer 406 of FIG. 4. The new viewed position on user interface 406 is returned as (x', y').

At 504, the viewport position (x', y') is converted to a document view position. The operating system returns the x, y position of the user's touch or position event on the viewport. Based on the drawing's pan and zoom level, the x, y position on the drawing is calculated by adding or subtracting the panned x, y values and dividing by the zoom value At 506, the document absolute position (x", y") or document coordinates on document layer 404 is determined by applying an inverted document rotation to the document view position returned from 504. In embodiments, a PDF Kit (i.e., functionality used to render a .pdf document) used in embodiments returns an inverted position based on a screen position which is then inverted using the following swift pseudo-code that includes position translators:

Import relevant libraries for device to render documents;
Extend Document Viewing Controller with a position translator;
Declare a variable named positionTranslation and return relative to absolute position;
Declare a variable named absoluteToRelativePosition-Translation and return external view to unit position translation;
Define a function named relativeToAbsolutePosition-Translator with the following parameters and provide an output of Core Graphics Points;
If document is not a document return zero as values;
Declare a constant named pdfPoint with scaling and rotation factors applied;
Declare a constant named pdfViewPoint with page number and view area;
Define a function viewToRelativePositionTranslator with parameters as viewpoints and returning Core
Graphics Points;
If constant pageview is assigned a first page and viewpoint is within bounds apply inverted values for co-ordinate correction and return points on screen.

At 508, the (x, y) coordinates for the pinstore is generated by normalizing the absolute position (x", y") from 506 based on the size of the displayed document.

At 510, the normalized position is stored in the pinstore.

Figure 6:
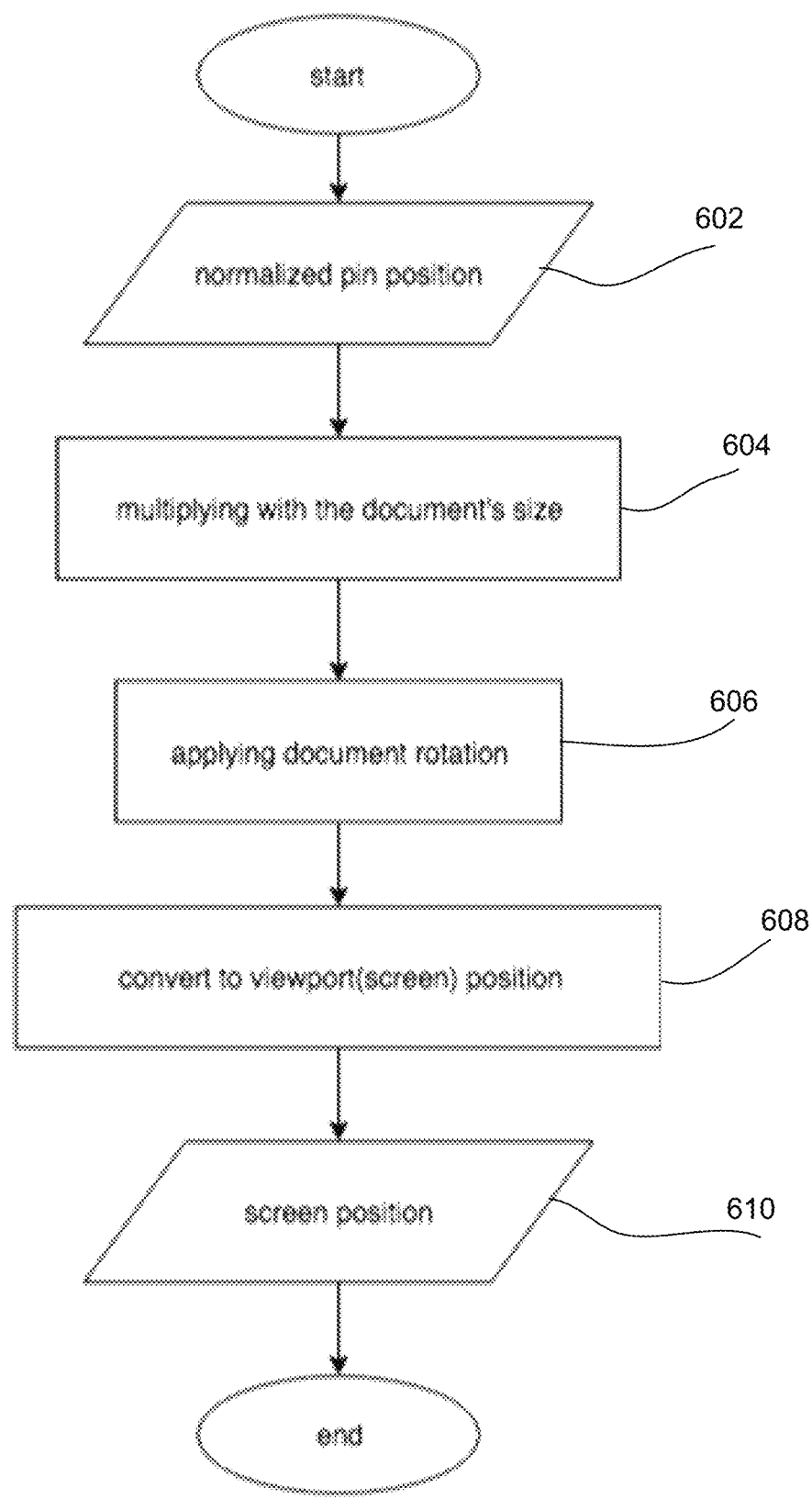
FIG. 6 is a flow diagram of the functionality of the construction plan enhancement module of FIG. 1 when converting a pinstore stored position of the data object in accordance with one embodiment.

FIG. 6 is a flow diagram of the functionality of construction plan enhancement module 16 of FIG. 1 when converting a pinstore stored position of the data object (i.e., (x, y) in pinstore 402) to the displayed screen or viewport position of a data object (i.e., (x', y') on user interface 406) in accordance with one embodiment. The functionality of FIG. 6 converts the pinned position as stored in pinstore layer 402 to the displayed pinstore position of viewport layer 406 of FIG. 4.

At 602, the normalized position of the pinned object as (x, y) in pinstore 402 is obtained.

At 604, the (x, y) is multiplied with the size of the displayed drawing/document to get the absolute position (x", y") at document layer 404. When a user pans or zooms, embodiments calculate the absolute position of the pin on the drawing with the code in the position translators.

At 606, the document view position at 406 is generated by applying a document rotation to the document absolute position returned from 604. This requires embodiments to coordinate and match two coordinate systems, one that is the PDF viewer tech's coordinate system and the other is the viewport's coordinate system, Embodiments compare and match to avoid errors in the difference of the coordinate systems.

At 608, the document view position to converted to the viewport position (x', y'). The relative positions are converted to absolute document positions in the code for translators.

At 610, the pinned data object 410 is displayed at (x', y') on the viewport 406.

Figure 7:
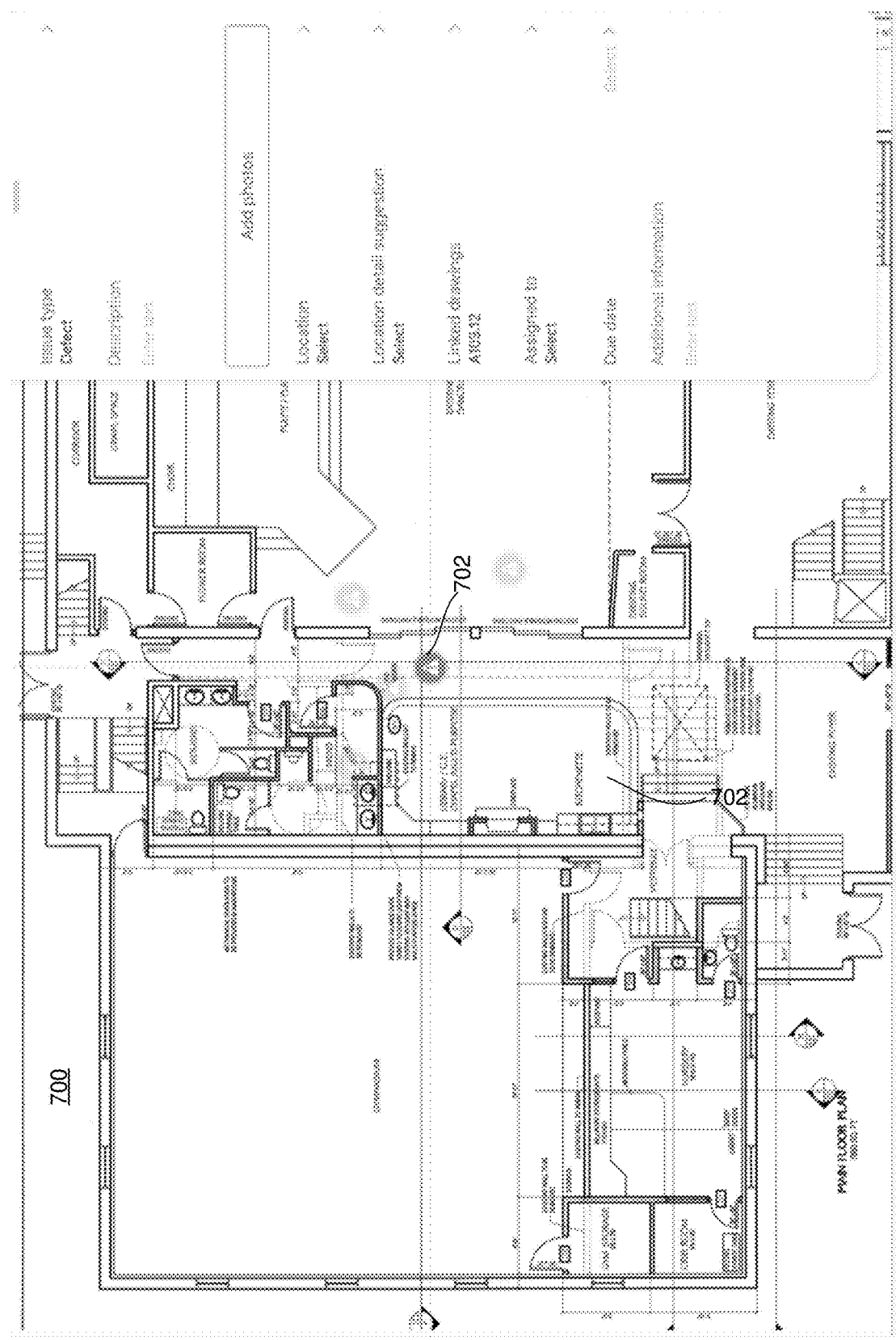
FIG. 7 illustrates an example view of a drawing that includes a data object as viewed by a user in accordance with embodiments of the invention.

FIG. 7 illustrates an example view of a drawing 700 that includes a data object 702 as viewed by a user in accordance with embodiments of the invention.

Embodiments allow for the layering of custom data (i.e., data objects or records) on top of documents without using open .pdf or other markup standards. With embodiments, the document being pinned does not get modified in any way. Further, embodiments allow for data injection into the pin from any record metadata, which is not possible using markups.

Figure 8:
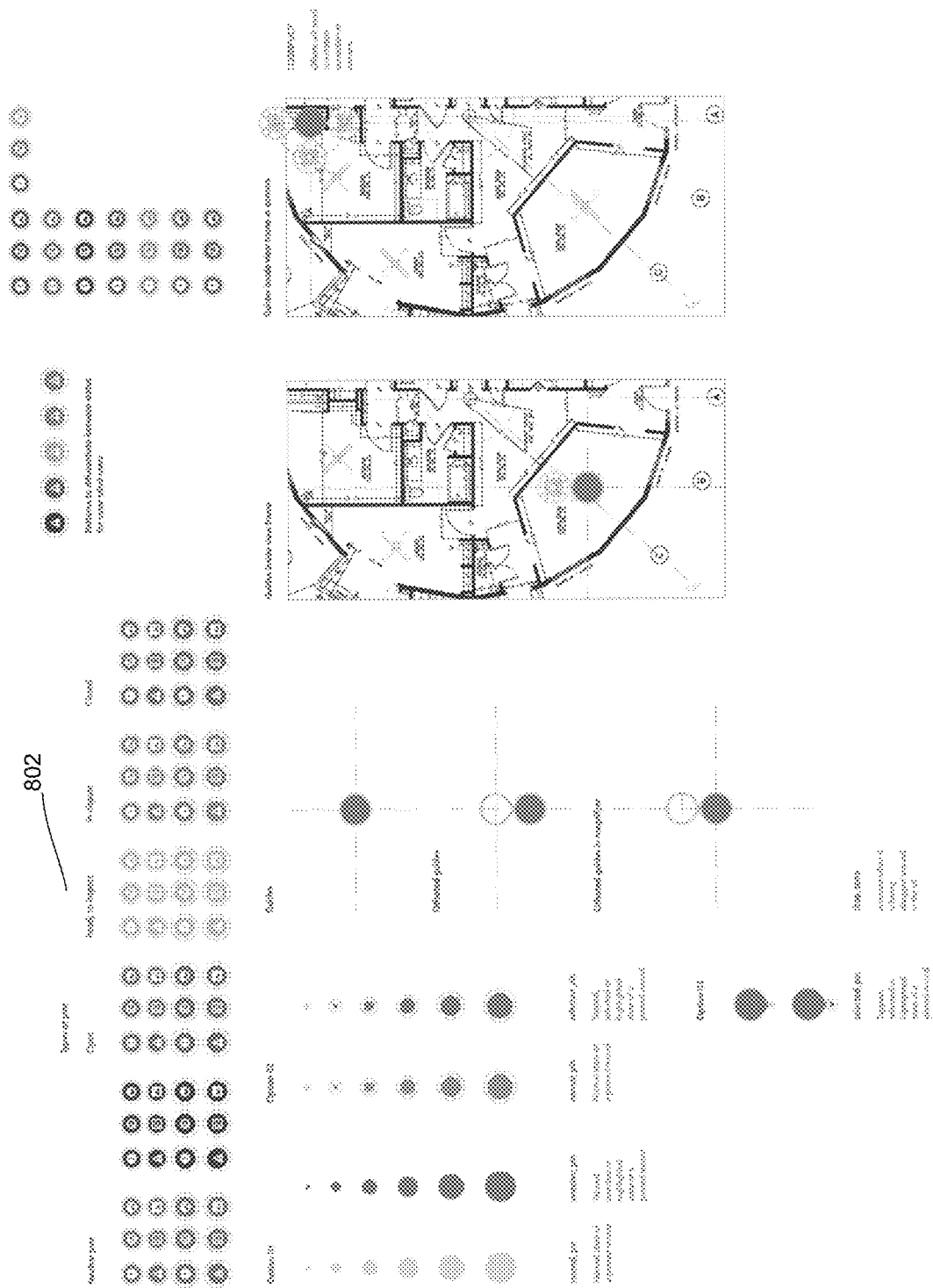
FIG. 8 illustrates a user interface that provides for a selection of different types of pins in accordance to embodiments.

In embodiments, the pins are represented or rendered to build the anatomy, which provides complete control on the shape, size, color, text, icons etc. Embodiments enable any of those values to be changed or manipulated based on the business record's data. In contrast, markups have a standard stack of components, such as image, circle, square, text, etc., which have in turn a limited set of properties that can be manipulated. This limits the representation of a business record to either a static image or representation produced by another system. FIG. 8 illustrates a user interface that provides for a selection of different types of pins at 802 in accordance to embodiments. In FIG. 8, different pins have different icons, or different colors, or different sizes, depending on the information to be conveyed by the pin in association with the data object.

Embodiments provide for contextual data manipulation of non-standard .pdf data elements. In embodiments, if the pin's anatomy is a view for a circle representation, this can be changed to any shape, which in turn embodies an icon, which can be dynamically changed by the record that is represented. The parent view also has the property of status, color and other freeform components such as text labels that can be embedded with the pin view. This is not possible using standards data elements in .pdf.

Figure 9:
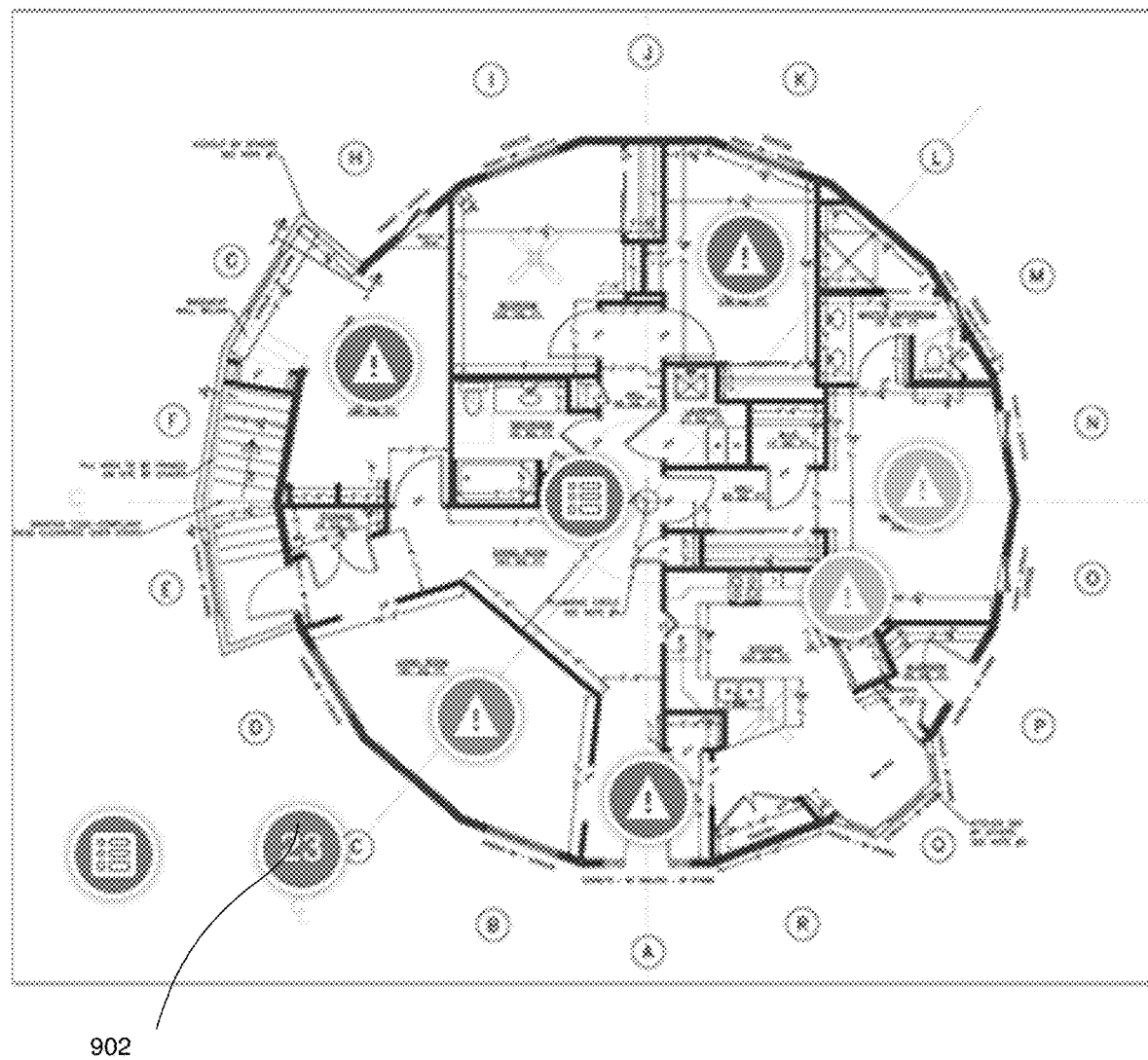
FIG. 9 illustrates a user interface showing a cluster of pins in accordance to embodiments.
Figure 10:
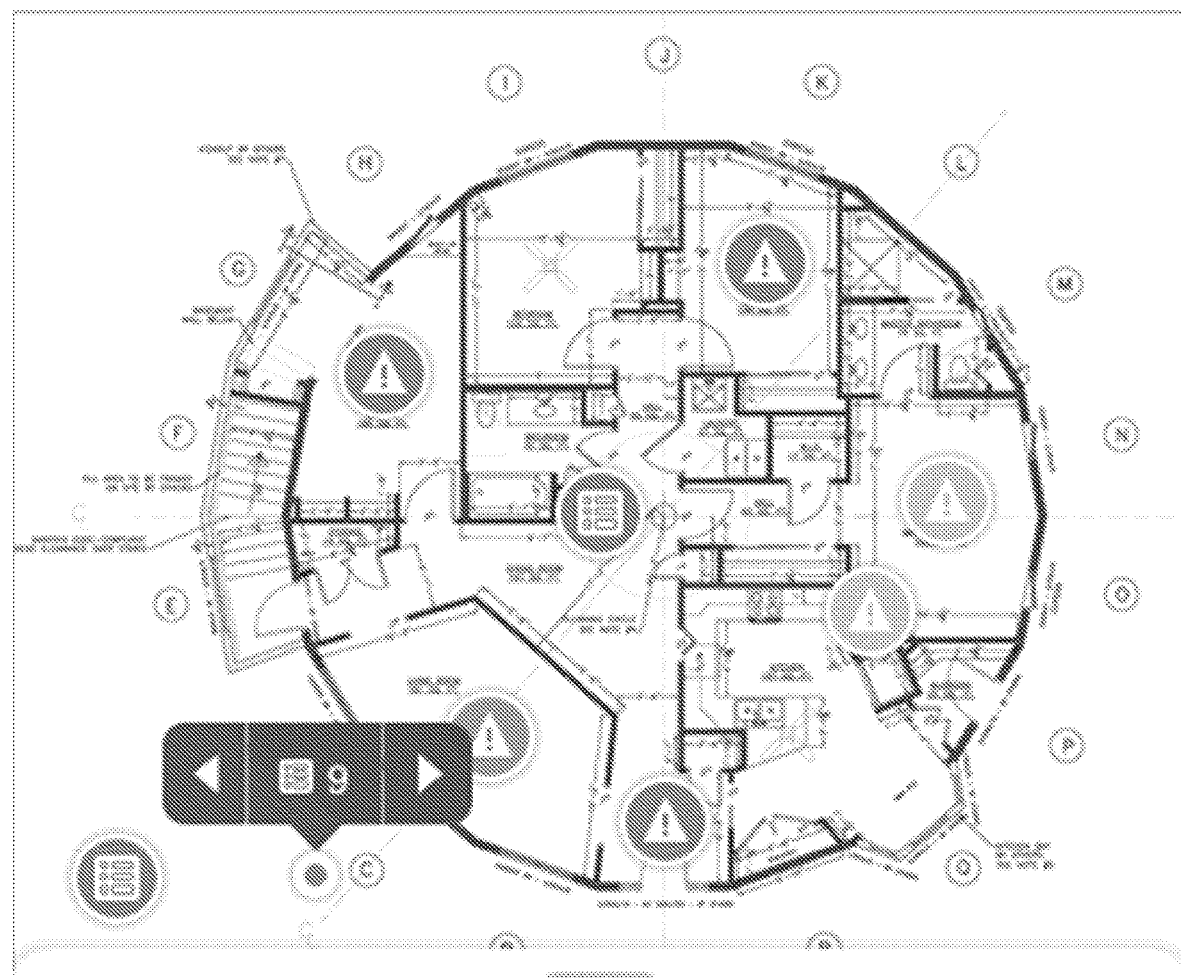
FIG. 10 illustrates how each of the data objects represented by each of the pins of the cluster of pins are described in accordance to embodiments.

Embodiments allow for more than one pin to be manipulated simultaneously. When two or more pins are either on the same position or overlapping due to their size bounds, embodiments use a clustering algorithm to combine and show a new visual representation of the cluster of pins. Embodiments allow clustering algorithms to run on a custom layer that helps the user to see aggregates of pins at different zoom levels. This cannot be done on markup layers. FIG. 9 illustrates a user interface showing a cluster of pins 902 in accordance to embodiments. FIG. 10 illustrates how each of the data objects represented by each of the pins of the cluster of pins are described in accordance to embodiments.

With embodiments, pinning can be done at any zoom level and live and dynamic data updates (e.g., status colors, status labels, etc.) can be updated in real time. Embodiments can transpose the document from 2D to 3D and the pin can be positioned in the z index which cannot be achieved using markups. With embodiments, any record including 3D models can be superimposed on top of the document which cannot be achieved using markups.

Figure 11:
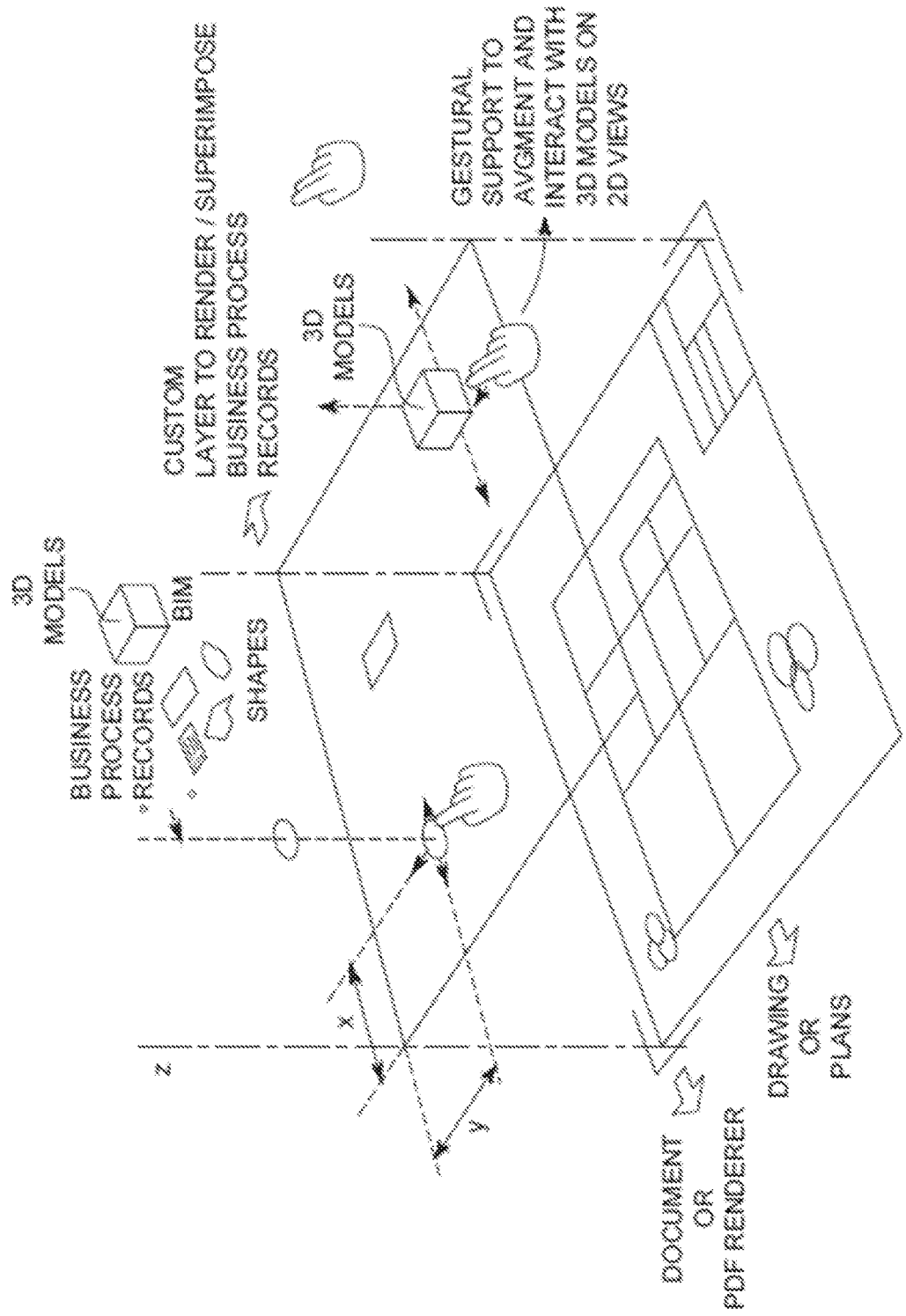
FIG. 11 illustrates 2D to 3D pin translation in accordance to embodiments.

FIG. 11 illustrates 2D to 3D pin translation in accordance to embodiments. The business process records in the form of 3D models are shown at 1102. A viewport layer 1106 is shown on top of a pdf layer 1104. Viewport layer 1106 functions as a custom layer to render/superimpose the business process records (i.e., data objects) in the form of a pin 1110. As shown, embodiments provide a UI with gestural support to augment and interact with 3D models on 2D views.

Figure 12:
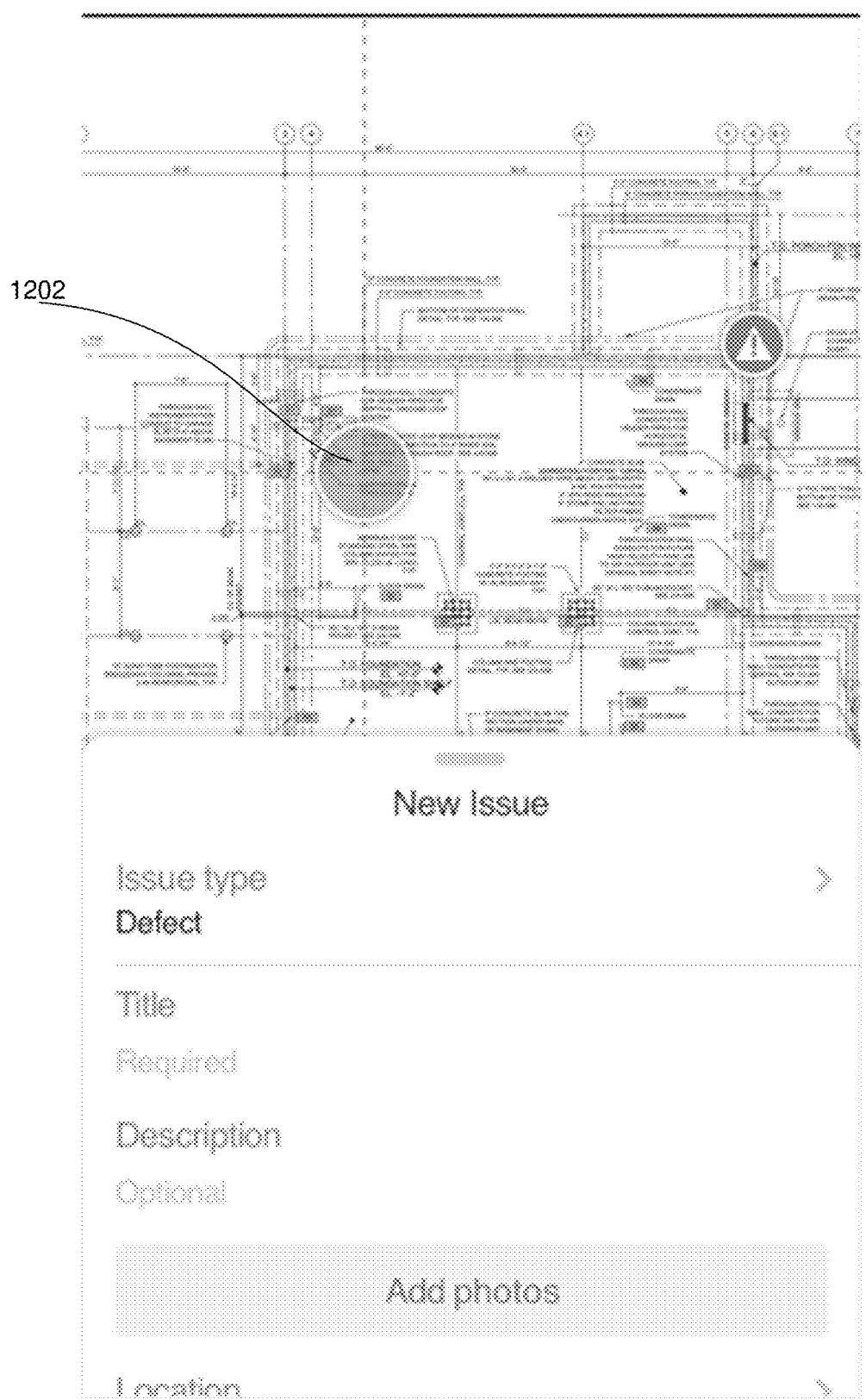
FIG. 12 illustrates an example having a "transparent" pin in accordance to embodiments.
Figure 13:
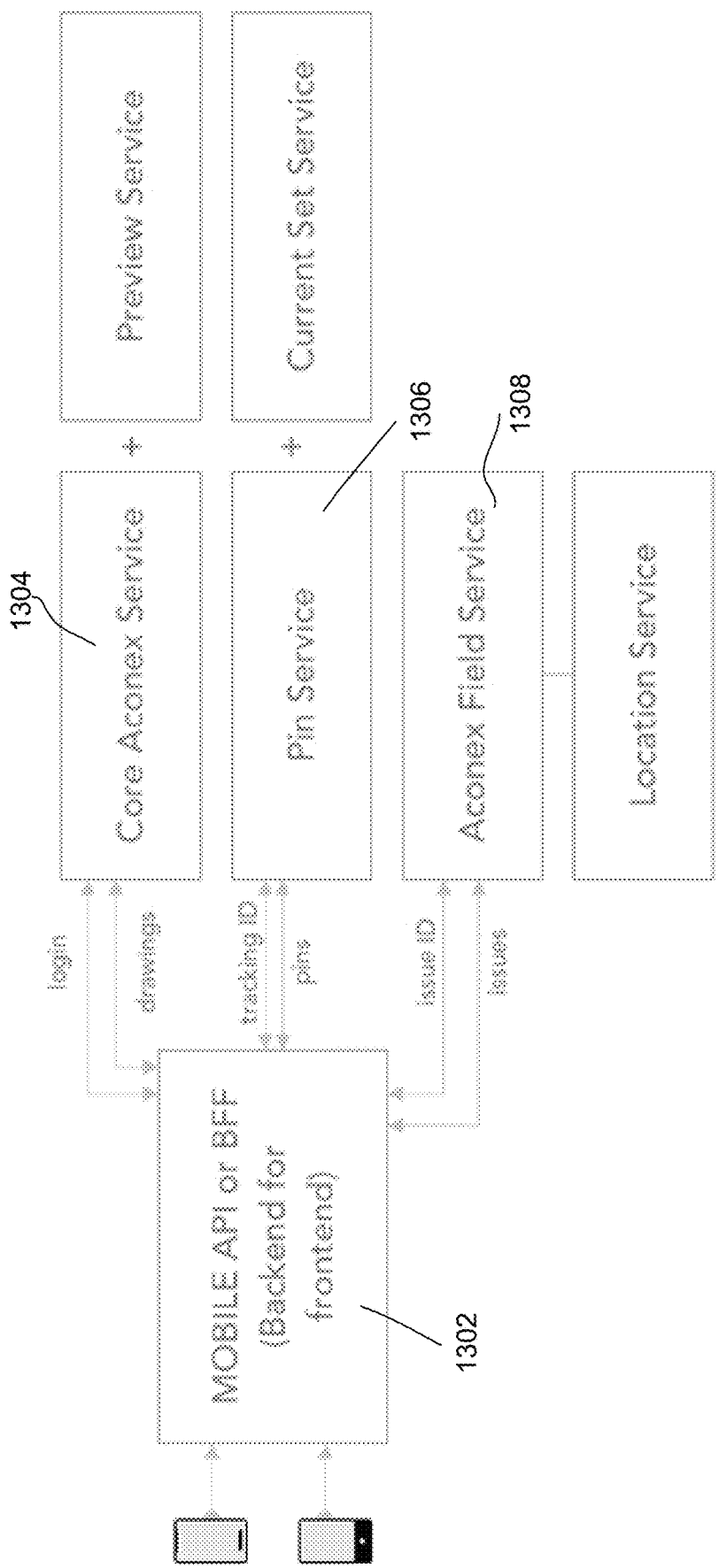
FIG. 13 is an overview block diagram of embodiments of the invention.

With embodiments, pins can be customized to any transparency to see the document underneath so accuracy of pinning is possible in comparison to other markup methods. FIG. 12 illustrates an example having a "transparent" pin 1202 in accordance to embodiments. Because in embodiments, the pins are on a separate layer, the transparency can be controlled by changing the alpha or opacity, which allows the user to see through the pin and see the details of the drawing With embodiments, pin information is stored in a separate database and not merged with the document. FIG. 13 is an overview block diagram of embodiments of the invention. A mobile API or backend for frontend ("BFF") couples the end user device to the main system. For mobile end user devices such iOS or Android devices, the BFF receives all JavaScript Object Notation ("JSON") calls from the mobile app and then aggregates downstream requests, maps responses to maintain compatibility and provides an anti-corruption layer. The core service 1304 provides the drawings, in the form of .pdf drawings in one embodiment. The pin service 1306 (i.e., a database separate from the database that stores the drawings) provides the pins and tracking IDs. Pin service 1306 stores the relationships between drawings and issues as a 2D pin position. The field service 1308 provides location based issues with IssueIDs. In embodiments, all objects that are named "issues" are tightly coupled to the concepts of location/areas and IssueID is related to an area.

Figure 14:
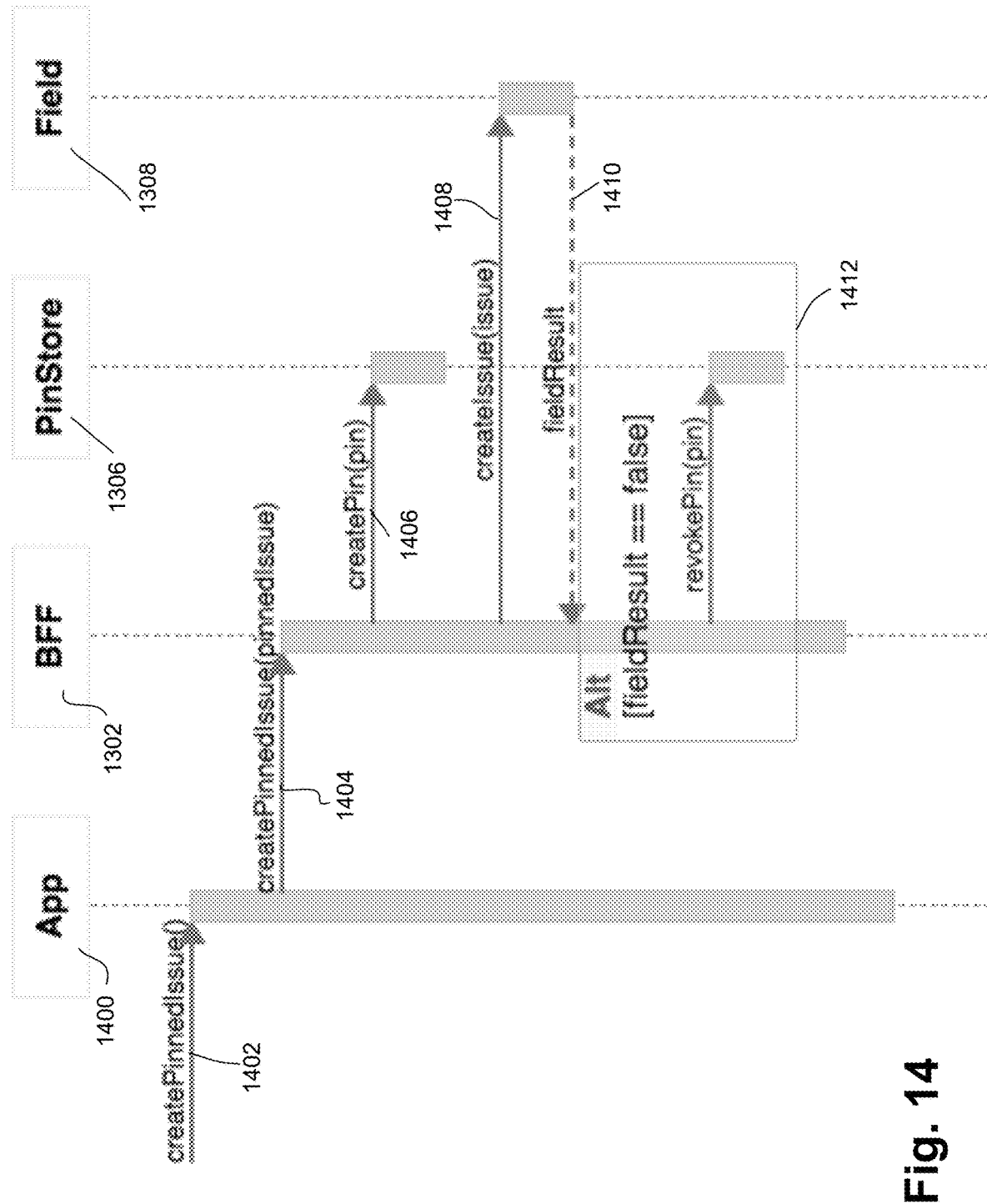
FIG. 14 illustrates a call flow between the elements of FIG. 13 when creating a pinned issue (i.e., a new data object) in accordance to embodiments.

Field service 1308 responds to requests as follows—
GET request—/api/projects/{project_id}/areas
For each project the database responds with
areas: list of areas
children: list of child areas FIG. 14 illustrates a call flow between the elements of FIG. 13 when creating a pinned issue (i.e., a new data object) in accordance to embodiments. A mobile app 1400 creates or receives the pinned issue at 1402 and send to BFF 1302 at 1404. BFF 1302 that generates a create pin request 1406 to pinstore 1306, and a create issue request 1408 to field service 1308. In response, field service 1410 generates a field result 1410, which are results from a "field" database that stores all the issues for construction project teams. In the alternative, at 1412, if the field result is false, the pin is revoked. Field service 1308 could respond with no results in the following situations: (1) There actually is no data created or stored; (2) There is no stable internet connection established between client and server; or (3) Authentication or permission has been denied for the client.

Figure 15:
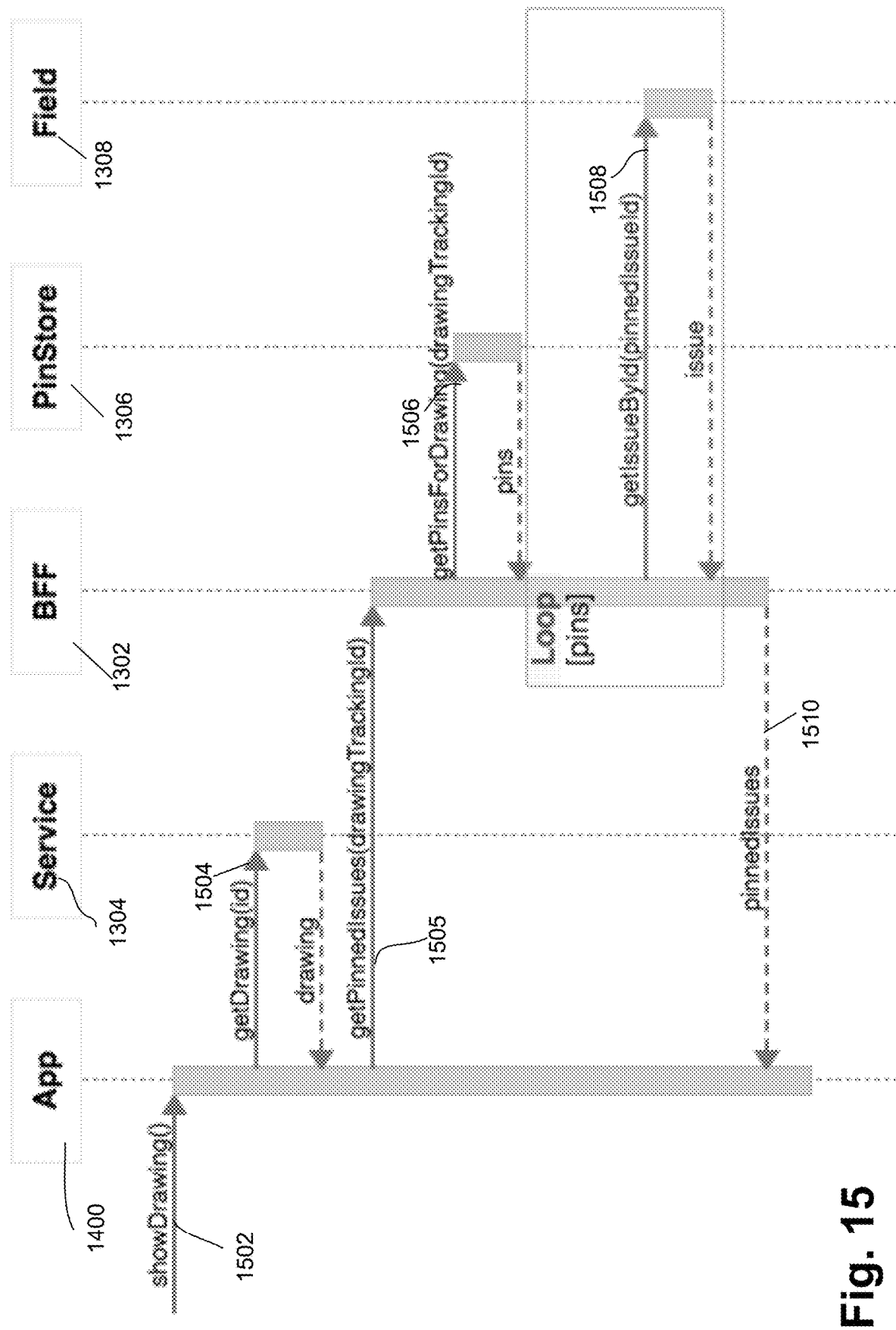
FIG. 15 illustrates a call flow between the elements of FIG. 13 when getting a pinned issue (i.e., a data object) in accordance to embodiments.

FIG. 15 illustrates a call flow between the elements of FIG. 13 when getting a pinned issue (i.e., a data object) in accordance to embodiments. At 1502, a show drawing request 1502 is received by App 1400. App 1400 generates a get drawing request 1504 to the core service 1304, and in response the drawing is retrieved (e.g., a pdf drawing) and displayed on the mobile device. App 1400 further generates a get all pinned issues that correspond to the drawing request 1505 to BFF 1302. BFF 1302 then requests the corresponding pins for the drawing at 1506 from pinstore 1306, which returns the pins in response. Further, the pin issues are retrieved from field 1308 at 1508 in a looped functionality for each pin, and the pinned issues are returned at 1510 to be displayed on the drawing in the viewport layer by App 1400.

Figure 16:
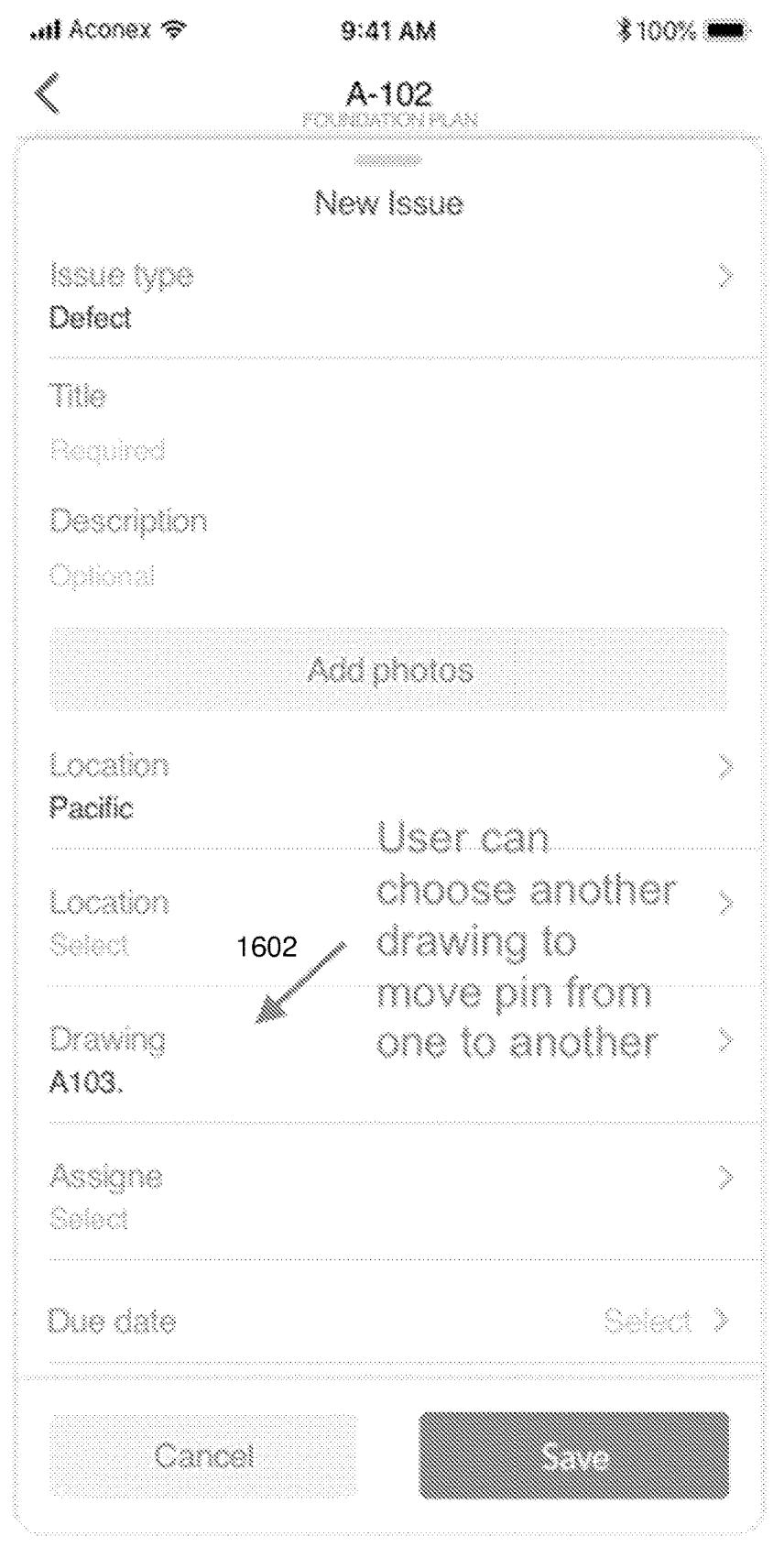

Pin information is isolated and encrypted so open PDF standard tools cannot view or modify the records and pin information can be moved from one document to the other. FIG. 16 illustrates an example screenshot in accordance to embodiments. As shown at 1602, embodiments provide an option where a user can choose another drawing to move a pin to.

As disclosed, embodiments allow construction plans to have pins that represent data objects to be layered on top of the underlying drawing. The drawing itself is not modified, and the separate layer can provide additional functionality.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A computer-implemented method of managing a construction plan on a computer-implemented device, the method comprising:

retrieving a stored drawing corresponding to the construction plan, the drawing comprising document coordinates that comprise an absolute position on the drawing;

rendering the drawing as a first size within a computer-implemented user interface;

retrieving a stored data object corresponding to an issue that corresponds to the construction plan, the data object comprising pinstore coordinates that comprise a normalized position of the data object;

generating a viewport layer rendered on top of the rendered drawing, the viewport layer comprising viewport coordinates that comprise a viewport position of the data object, the viewport layer comprising what is seen by a user on a display screen of the device;

converting the pinstore coordinates into the document coordinates;

converting the document coordinates of the data object to converted viewport coordinates;

displaying the data object as a pin on the viewport layer using the converted viewport coordinates, the pin comprising a representation of the data object;

receiving a change of position for the pin to generate new viewport coordinates, the change of position comprising moving the pin on the user interface;

converting the new viewport coordinates to a new document view position;

generating new document coordinates by applying a document rotation to the new document view position using an inverted position based on a viewport screen position and then inverting the inverted position using a position translator to translate between viewport coordinates and document coordinates; and generating new pinstore coordinates by normalizing the new document coordinates based on the first size of the rendered drawing;

wherein the drawing is stored a first database and the pin corresponds to the data object that is stored in a second database as a specialized schema that comprises a normalized position of the pin unrelated to a format of the drawing and the viewport layer, wherein the second database is different than the first database;

wherein the document coordinate system and viewport coordinate system comprise different x, y coordinate systems having different ratios of the x, y coordinates.

2. The method of claim 1, the converting the pinstore coordinates comprising:

multiplying the pinstore coordinates by the first size of the rendered drawing to generate the document coordinates;

generating a document view position by applying the document rotation to the document coordinates;

converting the document view position to the converted viewport coordinates.

3. The method of claim 1, the moving the pin on the user interface comprising a sliding drag and drop operation.

4. The method of claim 1, further comprising transposing the drawing from two dimensional to three dimensional, and positioning the pin in a z axis.

5. The method of claim 1, wherein the method of managing does not edit the drawing and retrieving a pinned issue comprises:

receiving via a mobile application programing interface (API) a JavaScript Object Notation (JSON) call;

retrieving the drawing from the first database;

retrieving the data object from the second database; and retrieving, from a field service, location based issues.

6. The method of claim 5, wherein the drawing comprises a pdf file.

7. The method of claim 1, wherein the data object comprises metadata that describes the issue and provides coordinates of the data object relative to the construction plan and the specialized schema comprises:

```
recordID: string GUID
pinID: GUID
drawing: {
  drawingID: GUID
  x: Number 0-1
  y: Number 0-1
}
record: {
  recordID: string
  recordType: Issue | Mail | Document | Photo
}.
```

8. The method of claim 1, wherein the rendering comprises returning an inverted position based on a screen position.

9. A construction plan management system comprising:

a first database storing a construction plan drawing;

a second database storing a data object corresponding to an issue that corresponds to the construction plan drawing;

one or more processors executing stored instructions and configured to, in response to a request to display the construction plan drawing on a computer-implemented device, the displaying comprising:

retrieving a stored drawing corresponding to the construction plan, the drawing comprising document coordinates that comprise an absolute position on the drawing;

rendering the drawing as a first size within a computer-implemented user interface;

retrieving the stored data object, the data object comprising pinstore coordinates that comprise a normalized position of the data object;

generating a viewport layer rendered on top of the rendered drawing, the viewport layer comprising viewport coordinates that comprise a viewport position of the data object, the viewport layer comprising what is seen by a user on a display screen of the device;

converting the pinstore coordinates into the document coordinates;

converting the document coordinates of the data object to converted viewport coordinates;

displaying the data object as a pin on the viewport layer using the converted viewport coordinates, the pin comprising a representation of the data object;

receiving a change of position for the pin to generate new viewport coordinates, the change of position comprising moving the pin on the user interface;

converting the new viewport coordinates to a new document view position;

generating new document coordinates by applying a document rotation to the new document view position using an inverted position based on a viewport screen position and then inverting the inverted position using a position translator to translate between viewport coordinates and document coordinates; and generating new pinstore coordinates by normalizing the new document coordinates based on the first size of the rendered drawing;

wherein the pin corresponds to the data object that is stored in the second database as a specialized schema that comprises a normalized position of the pin unrelated to a format of the drawing and the viewport layer, wherein the second database is different than the first database;

wherein the document coordinate system and viewport coordinate system comprise different x, y coordinate systems having different ratios of the x, y coordinates.

10. The system of claim 9, the converting the pinstore coordinates comprising:

multiplying the pinstore coordinates by the first size of the rendered drawing to generate the document coordinates;

generating a document view position by applying the document rotation to the document coordinates;

converting the document view position to the converted viewport coordinates.

11. The system of claim 9, the moving the pin on the user interface comprising a sliding drag and drop operation.

12. The system of claim 9, further comprising transposing the drawing from two dimensional to three dimensional, and positioning the pin in a z axis.

13. The system of claim 9, wherein the system does not edit the drawing and retrieving a pinned issue comprises:
receiving via a mobile application programing interface (API) a JavaScript Object Notation (JSON) call;
retrieving the drawing from the first database;
retrieving the data object from the second database; and
retrieving, from a field service, location based issues.

14. The system of claim 13, wherein the drawing comprises a pdf file.

15. The system of claim 9, wherein the data object comprises metadata that describes the issue and provides coordinates of the data object relative to the construction plan and the specialized schema comprises:

```
recordID: string GUID
pinID: GUID
drawing: {
   drawingID: GUID
   x: Number 0-1
   y: Number 0-1
}
record: {
   recordID: string
   recordType: Issue | Mail | Document | Photo
}.
```

16. The system of claim 9, wherein the rendering comprises returning an inverted position based on a screen position.

17. A non-transitory computer readable medium having instructions stored thereon that, when executed by one or more processors, cause the processors to manage a construction plan on a computer-implemented device, the managing comprising:
retrieving a stored drawing corresponding to the construction plan, the drawing comprising document coordinates that comprise an absolute position on the drawing;
rendering the drawing as a first size within a computer-implemented user interface;
retrieving a stored data object corresponding to an issue that corresponds to the construction plan, the data object comprising pinstore coordinates that comprise a normalized position of the data object;
generating a viewport layer rendered on top of the rendered drawing, the viewport layer comprising viewport coordinates that comprise a viewport position of the data object, the viewport layer comprising what is seen by a user on a display screen of the device;
converting the pinstore coordinates into the document coordinates;
converting the document coordinates of the data object to converted viewport coordinates;
displaying the data object as a pin on the viewport layer using the converted viewport coordinates, the pin comprising a representation of the data object;
receiving a change of position for the pin to generate new viewport coordinates, the change of position comprising moving the pin on the user interface;
converting the new viewport coordinates to a new document view position;
generating new document coordinates by applying a document rotation to the new document view position using an inverted position based on a viewport screen position and then inverting the inverted position using a position translator to translate between viewport coordinates and document coordinates; and
generating new pinstore coordinates by normalizing the new document coordinates based on the first size of the rendered drawing;
wherein the drawing is stored a first database and the pin corresponds to the data object that is stored in a second database as a specialized schema that comprises a normalized position of the pin unrelated to a format of the drawing and the viewport layer, wherein the second database is different than the first database;
wherein the document coordinate system and viewport coordinate system comprise different x, y coordinate systems having different ratios of the x, y coordinates.

18. The computer readable medium of claim 17, the converting the pinstore coordinates comprising:
multiplying the pinstore coordinates by the first size of the rendered drawing to generate the document coordinates;
generating a document view position by applying the document rotation to the document coordinates;
converting the document view position to the converted viewport coordinates.

19. The computer readable medium of claim 17, the moving the pin on the user interface comprising a sliding drag and drop operation.

20. The computer readable medium of claim 17, wherein the drawing is not edited.

* * * * *

UNITED STATES PATENT AND TRADEMARK OFFICE
CERTIFICATE OF CORRECTION

| | | |
|---|---|---|
| PATENT NO. | : 12,014,119 B2 | |
| APPLICATION NO. | : 16/272015 | |
| DATED | : June 18, 2024 | |
| INVENTOR(S) | : Ramesh et al. | |

It is certified that error appears in the above-identified patent and that said Letters Patent is hereby corrected as shown below:

On the Title Page

On page 2, Column 2, under item (56) Other Publications, Line 8, delete "Constructon" and insert -- Construction --, therefor.

In the Drawings

On sheet 11 of 16, in Fig. 11, Line 14, delete "AVGMENT" and insert -- AUGMENT --, therefor.

In the Specification

In Column 2, Line 57, delete "nonvolatile" and insert -- non volatile --, therefor.

In Column 6, Line 11, delete "issue ID)" and insert -- issueID) --, therefor.

In Column 7, Line 34, delete "value" and insert -- value. --, therefor.

In Column 9, Line 37, delete "drawing" and insert -- drawing. --, therefor.

In the Claims

In Column 11, Line 48, in Claim 6, delete "pdf" and insert -- .pdf --, therefor.

In Column 13, Line 12, in Claim 14, delete "pdf" and insert -- .pdf --, therefor.

Signed and Sealed this
First Day of October, 2024

Katherine Kelly Vidal
*Director of the United States Patent and Trademark Office*